United States Patent [19]
Shirota et al.

[11] Patent Number: 5,583,553
[45] Date of Patent: Dec. 10, 1996

[54] FORMING METHOD OF COLOR IMAGES

[75] Inventors: Koromo Shirota, Inagi; Shoji Koike; Kyoko Fukushima, both of Yokohama, all of Japan

[73] Assignee: Canon Kabushiki Kaisha, Tokyo, Japan

[21] Appl. No.: 393,037

[22] Filed: Feb. 23, 1995

Related U.S. Application Data

[63] Continuation of Ser. No. 859,167, Mar. 27, 1992, abandoned.

[30] Foreign Application Priority Data

Apr. 4, 1991 [JP] Japan ..................... 3-097898

[51] Int. Cl.$^6$ ..................... B41J 2/015
[52] U.S. Cl. ..................... 347/100; 347/105
[58] Field of Search ..................... 347/101, 105, 347/100

[56] References Cited

U.S. PATENT DOCUMENTS

| | | | |
|---|---|---|---|
| 4,425,405 | 1/1984 | Murakami | 346/140 R |
| 5,081,470 | 1/1992 | Kurabayashi et al. | 346/140 R |
| 5,160,370 | 11/1992 | Suga et al. | 346/140 R |
| 5,459,502 | 10/1995 | Sakaki et al. | 347/100 |

FOREIGN PATENT DOCUMENTS 0404494  12/1990  European Pat. Off. .

OTHER PUBLICATIONS

Grant, et al., "Grant & Hackh's Chemical Dictionary", 1987, p. 165.

*Primary Examiner*—Valerie A. Lund
*Attorney, Agent, or Firm*—Fitzpatrick, Cella, Harper & Scinto

[57] ABSTRACT

Disclosed herein is a method of forming color images with color inks including a cyan ink on a recording material provided with an ink-receiving layer, which contains basic magnesium carbonate and has a dry coat weight of from 1 to 15 g/m$^2$, wherein at least one of the cyan ink and one or more another inks to form mixed-color areas with the cyan ink contains a surface active agent, wherein a cyan dye contained in the cyan ink is represented by the general formula

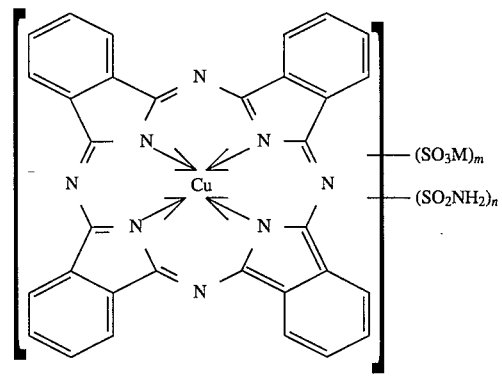

wherein M means an alkali metal atom, an ammonium ion or an organic amine residue, m stands for a number of from 1 to 4, and is a number of from 0 to 3.

24 Claims, 3 Drawing Sheets

FORMING METHOD OF COLOR IMAGES

This application is a continuation of application Ser. No. 07/859,167 filed Mar. 27, 1992, now abandoned.

BACKGROUND OF THE INVENTION

1. Field of the Invention

The present invention relates to a method of forming color images, and more specifically to a method of forming color images excellent in image quality on paper having an ink-receiving layer by an ink-jet recording system.

2. Related Background Art

The ink-jet recording system is a method in which recording is conducted by forming droplets of an ink by any one of various ink-jetting systems and then causing a part or the whole of the droplets thus formed to adhere onto a recording material such as paper. As inks suitable for use in forming color images by such an ink-jet recording system, there are used those obtained by separately dissolving or dispersing water-soluble dyes having different hues, for example, cyan, magenta, yellow, black, etc., in water or a liquid medium composed of water and a water-soluble organic solvent. Color images are formed by using at least two of these inks different in hue from each other.

Recording materials having an ink-receiving layer have heretofore been used for the purpose of obtaining images of better quality. Such recording materials have been commonly coated with an ink-receiving layer having a dry coat weight of at least 20 g/m² (referred to as "heavy-coated paper"). In recent years, it has however been desired from the viewpoint of cost and performance to change the recording material from the heavy-coated paper to paper whose ink-receiving layer has a dry coat weight of from 1 to 15 g/m² (referred to as "light-coated paper"). In the conventional coated paper sheets, silica is generally contained as a pigment in their ink-receiving layers to cause it to adsorb a dye though the use of alumina is investigated in part. However, it has recently been found that the use of basic magnesium carbonate as a pigment provides coated paper sheets excellent, in particular, in weatherability of images formed thereon.

It goes without saying that a variety of performance characteristics are required of the conventional forming methods of color images as described above. Among others, the weatherability of images is a very important factor. It is therefore desired that light-coated paper containing basic magnesium carbonate as a pigment and markedly improved in such weatherability should be put to practical use as early as possible.

The present inventors have however found that when a cyan ink is mixed with another ink of a different color to print with a mixed ink on a light-coated paper sheet which contains basic magnesium carbonate as a pigment, a color irregularity of images, which does not occur in the case of the conventional coated paper making use of a silica pigment, appears. A further investigation has been conducted on this color irregularity. As a result, it has been found that the color irregularity occurs more often in light-coated paper than in heavy-coated paper, and most often in the case where the pigment is basic magnesium carbonate. This color irregularity becomes more conspicuous where solid printing is conducted in a certain large area at a certain ink-jetting rate. On one hand, when a color printer is used, color graphs are often made by carrying out uniform solid printing with two inks of different colors overlapped to each other. In this case, a color irregularity also tends to occur.

SUMMARY OF THE INVENTION

It is accordingly an object of this invention to provide a method of forming color images, which permits the formation of color images free from a color irregularity even when light-coated paper, which contains basic magnesium carbonate as a pigment and is far excellent in weatherability of the images formed compared with the conventional coated paper, is used, and excellent in weatherability.

The above object can be achieved by the present invention described below.

According to the present invention, there is thus provided a method of forming color images with color inks including a cyan ink on a recording material provided with an ink-receiving layer, which contains basic magnesium carbonate and has a dry coat weight of from 1 to 15 g/m², wherein at least one of the cyan ink and one or more another inks to form mixed-color areas with the cyan ink contains a surface active agent.

According to the present invention, there is also provided a method of forming color images with color inks including a cyan ink in accordance with an ink-jet recording system on a recording material provided with an ink-receiving layer, which contains basic magnesium carbonate and has a dry coat weight of from 1 to 15 g/m², wherein at least one of the cyan ink and one or more another inks to form mixed-color areas with the cyan ink contains a surface active agent.

According to the present invention, there is further provided a method of forming color images with color inks including a cyan ink in accordance with an On-Demand type ink-jet recording system on a recording material provided with an ink-receiving layer, which contains basic magnesium carbonate and has a dry coat weight of from 1 to 15 g/m², wherein at least one of the cyan ink and one or more another inks to form mixed-color areas with the cyan ink contains a surface active agent.

According to the present invention, there is still further provided a method of forming color images with color inks including a cyan ink in accordance with an ink-jet recording system making use of thermal energy on a recording material provided with an ink-receiving layer, which contains basic magnesium carbonate and has a dry coat weight of from 1 to 15 g/m², wherein at least one of the cyan ink and one or more another inks to form mixed-color areas with the cyan ink contains a surface active agent.

DESCRIPTION OF THE PREFERRED EMBODIMENTS

The present inventors have carried out an extensive investigation on various manners of ink compositions with a view toward improving the color irregularity occurred in mixed-color areas on light-coated paper containing basic magnesium carbonate as a pigment. As a result, it has been found that there is a region in which when a surface active agent is contained in at least one of two inks which cause a color irregularity upon their mixing, the color irregularity does not occur at all.

Although this reason is not understood completely, the present inventors forms the following conjecture. The color irregularity is considered to be caused by a cyan dye, another dye and basic magnesium carbonate, and hence to be a problem characteristic of coated paper containing basic magnesium carbonate. The color irregularity in the mixed-color areas is therefore believed to be caused by the fact that the dyes mixed do not become easily intimate with each other on the surface of the pigment in the coating layer unlike the surface of plain paper. In particular, it is considered that the cyan dye is hard to become intimate with another dye on the surface of the pigment in the coated paper. It is therefore believed that when a surface active agent is contained in at least one of the inks separately containing such dyes, the dyes become easy to get intimate with each other on the coating layer, leading to the improvement of the color irregularity.

The present invention will hereinafter be described in more detail by the following preferred embodiments.

The principal feature of this invention is that when a plurality of color inks including a cyan ink is used to form color images on a recording material provided with an ink-receiving layer containing basic magnesium carbonate, a surface active agent contained in at least one of the cyan ink and other inks which form mixed-color areas with the cyan ink permits the formation of color images free from a color irregularity.

The color irregularity in the mixed color as described above occurs in inks containing any cyan dye. However, the color irregularity occurs most often in dyes suitably used as cyan dyes for ink-jet recording and represented by the following general formula (1):

(1)

wherein M means an alkali metal atom, an ammonium ion or an organic amine residue, m stands for a number of from 1 to 4, and n is a number of from 0 to 3. Such dyes are also advantageously affected by the addition of the surface active agent to a great extent.

As examples of the dyes represented by the general formula (1), may be mentioned the following dyes:

Dye No. 1-1:

Dye No. 1-2:

In the method of forming images with color inks according to this invention, cyan inks comprising any one of the above-described dyes are used. In addition, inks having a hue other than cyan are used in combination. When a magenta ink is used in combination, the color irregularity occurs most conspicuously. Examples of magenta dyes include xanthene dyes such as C.I. Acid Reds 50, 51, 52, 87, 91, 92, 93, 94, 95 and 98; anthraquinone dyes such as C.I. Acid Reds 80, 81, 82 and 83; and the like. Although the color irregularity occurs conspicuously in any magenta dyes, it tends to occur most often in monoazo magenta dyes represented by the following general formula (2):

(2)

wherein R means a hydrogen atom, a lower alkyl group, a lower alkoxy group, a lower acylamino group, a nitro group or a halogen atom, X denotes an acetyl, benzoyl, paratoluenesulfonyl or 4-chloro-6-hydroxy-1,3,5-triazine-2-yl group, M represents an alkali metal atom, an ammonium ion or an organic amine residue, l stands for a number of from 0 to 2, and m and n are individually 0 or 1. Such dyes are also advantageously affected by the addition of the surface active agent to a great extent.

As specific examples of such dyes, may be mentioned the following dyes:

Dye No. 2-1:

Dye No. 2-2:

Dye No. 2-3:

The color irregularity, which is a problem to be solved by the present invention, may also occur in color mixing of the cyan ink with inks used in the conventional ink-jet recording systems and containing a black or yellow dye in addition to the color mixing of the cyan ink with the magenta ink. Its degree is however lower compared with the color irregularity caused by the cyan and magenta inks. Further, the color irregularity caused by the cyan ink and the black or yellow ink can be solved by the addition of a surface active agent, and not by the structure of dye contained in the ink.

With respect to the surface active agent useful in the practice of this invention, any kinds of surfactants may have an effect. Among others, nonionic surface active agents are more effective. As exemplary nonionic surfactants, may be mentioned polyoxyethylene alkylamines, polyoxyethylene alkyl ethers, polyoxyethylene alkyl phenyl ethers, addition products of acetylene glycol and ethylene oxide (EO), and the like. Of these, the addition products of acetylene glycol and ethylene oxide (EO) are more effective. Further, addition products of acetylene glycol and about 10 moles of ethylene oxide are most effective.

All the inks as described above may be prepared in accordance with the prior art.

The content of the dye in an ink is determined according to the nature of a liquid medium to be used, properties required for the ink, etc. However, the dye generally comprises from 0.2 to 20% by weight, preferably from 0.5 to 10% by weight, most preferably from 1 to 5% by weight of the total weight of the ink.

The content of the surface active agent in an ink is within a range of from about 0.001 to 2% by weight, preferably from 0.01 to 1% by weight, more preferably from 0.01 to 0.1% by weight of the total weight of the ink.

A solvent suitable for use in the ink according to this invention is water or a mixed solvent composed of water and a water-soluble organic solvent with the mixed solvent of water and the water-soluble organic solvent being particularly preferred. As exemplary organic solvents, may be mentioned alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol, and halogenated derivatives thereof; amides such as dimethylformamide and dimethylacetamide; ketones and keto alcohols such as acetone and diacetone alcohol; ethers such as tetrahydrofuran and dioxane; addition polymers of oxyethylene or oxypropylene, such as diethylene glycol, triethylene glycol, tetraethylene glycol, dipropylene glycol, tripropylene glycol, polyethylene glycol and polypropylene glycol; alkylene glycols whose alkylene moiety has 2 to 6 carbon atoms, such as ethylene glycol, propylene glycol, trimethylene glycol, butylene glycol and hexylene glycol; thiodiglycol; 1,2,6-hexanetriol; glycerol; lower alkyl ethers of polyhydric alcohols, such as ethylene glycol monomethyl (or mono-ethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; sulfolane; N-methyl-2-pyrrolidone; 1,3-dimethyl-2-imidazolidinone; and the like.

The content of the water-soluble organic solvent is generally within a range of from 0.5 to 50% by weight, preferably from 1 to 30% by weight of the total weight of the ink.

The media as described above may be used either singly or in combination. The most preferred liquid medium is composed of water and at least one organic solvent, said solvent comprising at least one water-soluble high-boiling organic solvent, for example, polyhydric alcohol such as diethylene glycol, triethylene glycol, glycerol, 1,2,6-hexanetriol or thiodiglycol, or 2-pyrrolidone.

The principal components of the inks according to this invention are as described above. As necessary, other additives, for example, various kinds of dispersants, viscosity modifiers, surface tension modifiers, fluorescent brighteners, etc., may however be added within the limits unprejudicial to the achievement of the object of this invention.

As examples of such additives, may be mentioned viscosity modifiers such as polyvinyl alcohol, celluloses and water-soluble resins; surface tension modifiers such as diethanolamine and triethanolamine; pH adjustors such as buffers; fungicides; and the like.

Further, in order to prepare an ink which is used for an ink-jet recording system of a type that the ink is charged with electricity, a specific resistance adjustor such as lithium chloride, ammonium chloride or sodium chloride is added to the ink.

The outline of the inks useful in the practice of this invention has been described above.

Recording materials useful in the practice of this invention will hereinafter be described. The color irregularity of images, which is a problem to be solved by this invention, occurs remarkably in recording materials whose ink-receiving layers contain basic magnesium carbonate, said ink-receiving layers having a dry coat weight of from 1 to 15 $g/m^2$. This invention has more effect on these recording materials. In this case, the basic magnesium carbonate contained as a pigment may preferably be spherical. The present invention has still more effect where a recording material applied with a coating layer containing the above pigment, whose BET specific surface area ranges from 30 to 120 $m^2/g$ and whose iodine absorption per unit specific surface area is at least 1.5 $mg/m^2$, at a dry coat weight of from 1 to 10 g/m² is used. When a recording material applied with an ink-receiving layer containing the above-described pigment at a dry coat weight of from 3 to 7 g/m² is used, the effect of the present invention becomes further remarkable.

With respect to the pigment in the ink-receiving layer, it goes without saying that the basic magnesium carbonate pigment is used singly, but other pigments such as silica and alumina may be used in combination with the former pigment as necessary. In this case, the proportion of the basic magnesium carbonate contained in the ink-receiving layer is generally within a range of from 20 to 100% by weight, preferably from 30 to 100% by weight, more preferably from 40 to 100% by weight.

When the proportion of the basic magnesium carbonate is lower than 20% by weight, this invention has insufficient effect from the viewpoint of weatherability of images formed.

The color irregularity caused by the color mixing of the cyan ink with another ink and solved by the present invention occurs in the case where the mixing ratio of their inks is from 1:10 to 10:1 by weight, the total amount of the inks jetted is from 5 to 30 nl/mm², and printing is evenly conducted in an area of at least 9 mm². However, it occurs more remarkably where the mixing ratio of the cyan ink to another ink is from 1:5 to 5:1, and most remarkably where the mixing ratio is from 1:2 to 2:1. Further, the color irregularity occurs more conspicuously where the total amount of the inks jetted is from 8 to 25 nl/mm², and most remarkably where the amount is from 11 to 21 nl/mm². Furthermore, the color irregularity becomes more conspicuous as the printing area increases so long as it is at least 9 mm². The effect of the present invention is also exhibited remarkably under the above-described conditions.

According to the present invention, as described above, color images are formed by using a cyan ink in combination with at least one of other inks different in hue in accordance with an ink-jet recording system. As the ink-jet recording system, any conventional methods known per se in the art may be used, with a system making use of thermal energy, by which a great number of fine nozzles can be mounted side by side, being particularly preferred. This system making use of thermal energy is a method as disclosed in Japanese Patent Application Laid-Open No. 54-59936, in which an ink undergoes the rapid volumetric change by an action of thermal energy applied to the ink, so that the ink is ejected through an nozzle by the working force generated by this change of state.

Figure 1:
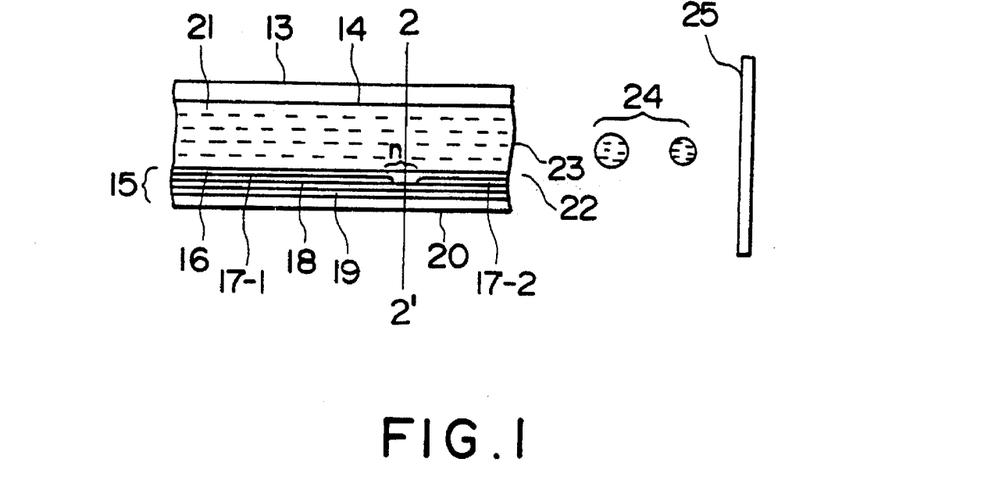
FIG. 1 is a cross-sectional view of a head of an ink-jet recording apparatus taken along the flow pass of a recording liquid.
Figure 2:
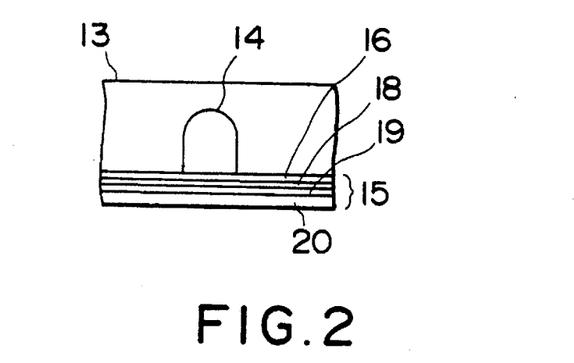
FIG. 2 is a cross-sectional view taken along line A-B of the head shown in FIG. 1.
Figure 3:
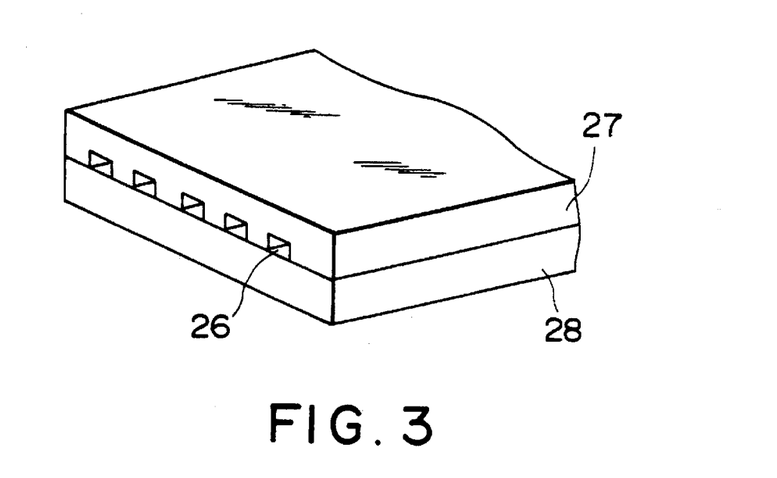
FIG. 3 is a perspective view of a multi-head which is an array of such heads as shown in FIG. 1.

Examples of the construction of an head, which is a main component of an apparatus for performing this recording method, are illustrated in FIGS. 1, 2 and 3.

A head 13 is composed of a glass, ceramic or plastic plate or the like having an ink-passing channel 14 and a heating head 15, which is used for thermal recording (the drawing shows a head to which, however, is not limited), said heating head 15 being bonded to the plate. The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 having good heat radiating property and made of alumina or the like.

A recording liquid 21 comes up to an ejection orifice 22 (a minute opening) and forms a meniscus 23 owing to a pressure P.

Now, upon application of electric signals to the electrodes 17-1, 17-2, the heating head 15 rapidly generates heat at the region shown by n to form bubbles in the recording liquid 21 which is in contact with the region. The meniscus 23 of the recording liquid is projected by the action of the pressure thus produced, and the recording liquid 21 is ejected from the orifice 22 to a recording material 25 in the form of recording droplets 24. FIG. 3 illustrates an appearance of a multi-head composed of an array of a number of heads as shown in FIG. 1. The multi-head is formed by bonding a glass plate 27 having a number of channels 26 to a heating head 28 similar to the head as illustrated in FIG. 1. Incidentally, FIG. 1 is a cross-sectional view of the head 13 taken along the flow path of the recording liquid, and FIG. 2 is a cross-sectional view taken along line A-B in FIG. 1.

Figure 4:
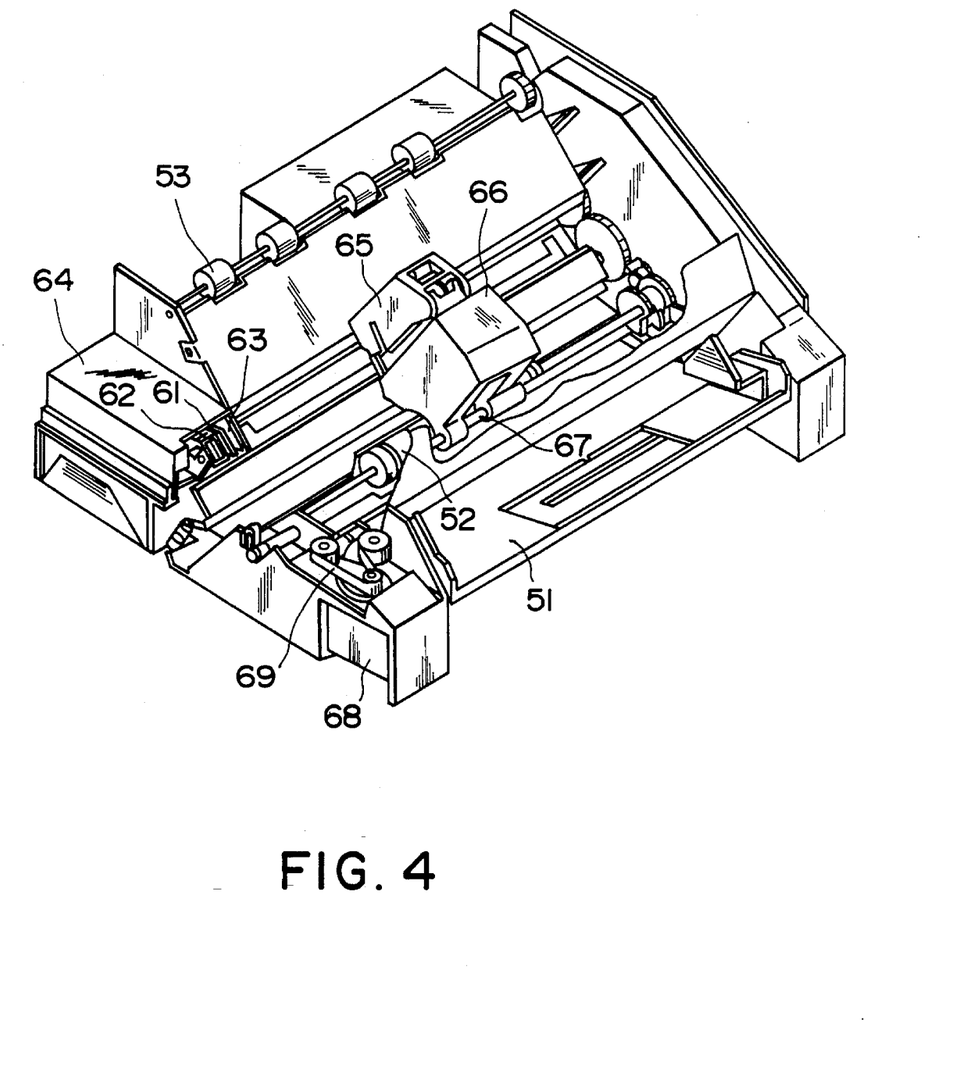
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at the position adjacent to the region in which a recording head operates, and in this embodiment, is held in such a form that it protrudes to the course through which the recording head is moved. Reference numeral 62 indicates a cap, which is provided at the home position adjacent to the blade 61, and is so constituted that it moves in the direction perpendicular to the direction in which the recording head is moved and comes into contact with the face of ejection openings to cap it. Reference numeral 63 denotes a recording liquid-absorbing member provided adjoiningly to the blade 61 and, similar to the blade, held in such a form that it protrudes to the course through which the recording head is moved. The above-described blade 61, cap 62 and absorbing member 63 constitute a recovery portion 64 for the recording head, where the blade 61 and absorbing member 63 remove off water, dust and/or the like from the face of the recording liquid-ejecting openings.

Reference numeral 65 designates the recording head having an ejection-energy-generating means and serving to eject the recording liquid onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
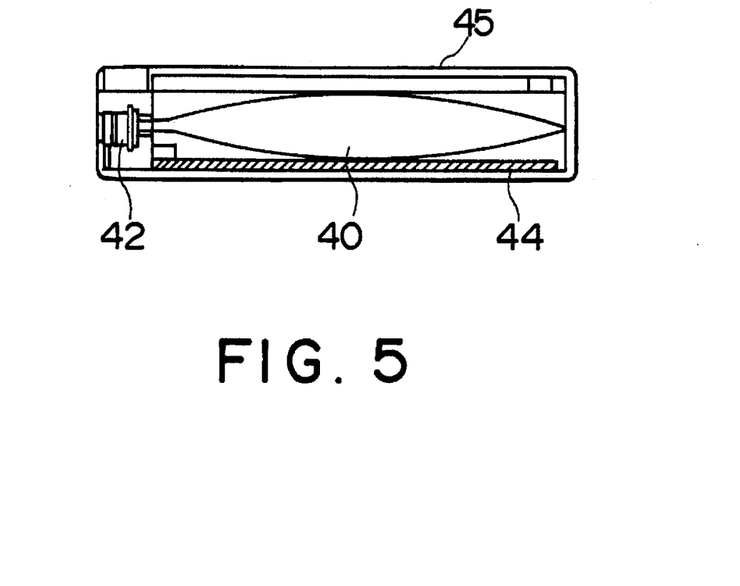
FIG. 5 is a cross-sectional view of an illustrative ink cartridge.

FIG. 5 illustrates an exemplary ink cartridge in which a recording liquid fed to the head through a recording liquid-feeding member, for example, a tube is contained. Here, reference numeral 40 designates a recording liquid container portion containing the recording liquid to be fed, as exemplified by a bag for the recording liquid. One end thereof is provided with a stopper 42 made of rubber. A needle (not illustrated) may be inserted into this stopper 42 so that the recording liquid in the bag 40 for the recording liquid can be fed to the head. Reference numeral 44 indicates a recording liquid absorbing member for receiving a waste liquid. It is preferred in this invention that the ink container portion is formed of a polyolefin, in particular, polyethylene, at its surface with which the ink comes into contact. The ink-jet recording apparatus used in this invention may not be limited to the apparatus as described above in which the head and the recording liquid cartridge are separately provided. Therefore, a device in which these members are integrally formed as shown in FIG. 6 can also be preferably used.

Figure 6:
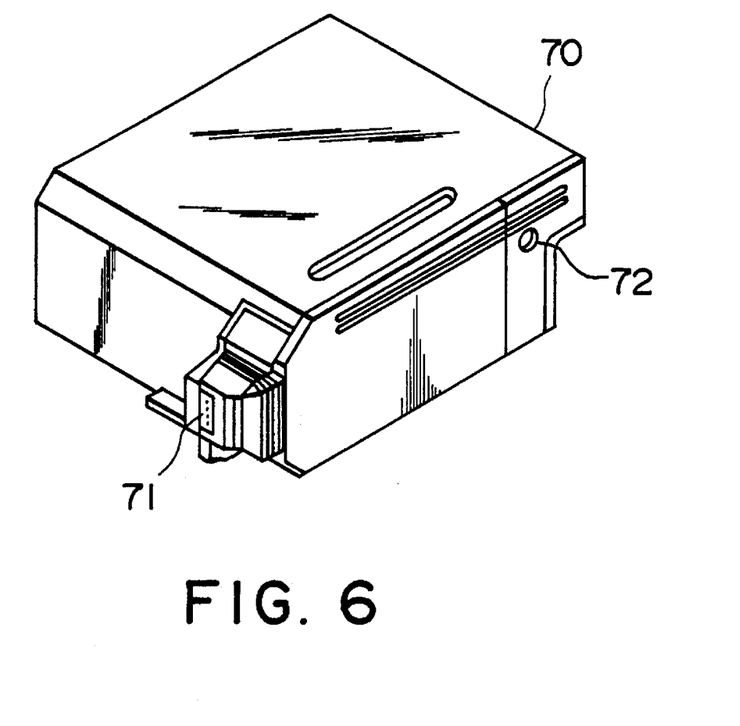
FIG. 6 is a perspective view of a recording unit.

In FIG. 6, reference numeral 70 designates a recording unit, in the interior of which a recording liquid container portion containing a recording liquid, for example, a recording liquid-absorbing member, is contained. The recording unit 70 is so constructed that the recording liquid in such a recording liquid-absorbing member is ejected in the form of recording liquid droplets through a head 71 having a plurality of orifices. In this invention, polyurethane is preferably used as a material for the recording liquid-absorbing member. Reference numeral 72 indicates an air passage for communicating the interior of the recording unit 70 with the atmosphere. The recording unit 70 can be used in place of the recording head shown in FIG. 4, and is detachably installed on the carriage 66.

EXAMPLES

The present invention will hereinafter be described more specifically by the following examples and Comparative examples. Incidentally, all designations of "part" or "parts" and "%" as will be used in the following examples mean part or parts by weight and % by weight unless expressly noted.

(Preparation of inks)

The following respective components were mixed, and 5 hours later, the pH of the resulting mixtures was adjusted with a 0.1% aqueous solution of sodium hydroxide. Each of the thus-adjusted mixtures was filtered under pressure through a membrane filter ("Floropore Filter", trade name, product of Sumitomo Electric Industries Ltd.) having a pore size of 0.22 μm, thereby preparing respective inks C1, M1 and Y1.

| Ink C1: | |
| --- | --- |
| Dye No. 1-2 described above | 3.0 parts |
| Triethylene glycol | 8.0 parts |
| 1,2,6-Hexanetriol | 9.0 parts |
| Ethanol | 5.0 parts |
| Nonionic surfactant (adduct of acetylene glycol with 10 moles of EO) | 0.05 part |
| Water | 74.95 parts |
| Ink M1: | |
| Dye No. 2-1 described above | 3.0 parts |
| Triethylene glycol | 8.0 parts |
| 1,2,6-Hexanetriol | 9.0 parts |
| Ethanol | 5.0 parts |
| Nonionic surfactant (adduct of acetylene glycol with 10 moles of EO) | 0.05 part |
| Water | 74.95 parts |
| Ink Y1: | |
| C.I. Direct Yellow 86 | 2.0 parts |
| Triethylene glycol | 8.0 parts |
| 1,2,6-Hexanetriol | 9.0 parts |
| Ethanol | 5.0 parts |
| Nonionic surfactant (adduct of acetylene glycol with 10 moles of EO) | 0.05 part |
| Water | 75.95 parts |

Further, inks C2, M2 and Y2 were prepared in the same manner as described above except for omission of the respective surfactants.

(Preparation of recording materials 1 and 2)

As base paper, there was provided a paper web having a Stöckigt sizing degree of 5 seconds and a basis weight of 66 g/m² and containing calcium carbonate in an amount of 9.0% as calculated in terms of ash in accordance with JIS-P-8128.

A coating formulation was prepared in accordance with the following composition.

| Water | 200 parts |
| --- | --- |
| Polyvinyl alcohol ("PVA-105", product of Kuraray Co., Ltd.) | 4 parts |
| Polyvinyl alcohol ("PVA-117", product of Kuraray Co., Ltd.) | 2 parts |
| Basic magnesium carbonate (obtained by hydrating magnesium oxide and then carbonating the hydrate) | 30 parts |
| Sodium hexametaphosphate | 0.6 part |

The preparation process of the coating formulation will be described. First, 150 parts of water was mixed with 30 parts of basic magnesium carbonate and 0.6 part of sodium hexametaphosphate. The mixture was dispersed using glass beads 1 mm across for 60 minutes at 1,500 rpm in a sand mill. The thus-obtained dispersion was then taken out of the sand mill and added with a solution containing 4 parts of PVA-105 and 2 parts of PVA-117 in 50 parts of water. The resulting mixture was stirred to obtain the coating formulation.

The coating formulation thus obtained was applied by a bar coater onto the above-described base paper to give a dry coat weight of 5 g/m² after drying at 110° C. for 5 minutes, thereby obtaining a recording material 1. Further, a recording material 2 was obtained in the same manner as the production of the recording material 1 except that 20 parts of basic magnesium carbonate and 10 parts of silica were used in place of the pigment in the recording material 1.

Using the inks prepared in accordance with the above-described process and an ink-jet printer equipped with respective heads (number of nozzles: 64 nozzles), each of which had about 14 nozzles per mm, for 4 color inks of Y, M, C and Bk, printing was conducted on each of the recording materials 1 and 2 varying the proportion of the inks to be mixed and the amount of the inks to be jetted to evaluate the degree of the color irregularity by the naked eye.

The degree of the color irregularity varies according to areas printed. The smaller the area printed, the more inconspicuous the color irregularity. To the contrary, the larger area makes the color irregularity more conspicuous. The color irregularity is not very conspicuous even when the inks are combined in any way so long as the printed area is smaller than 9 mm². Therefore, the printing area was standardized to 3×3 cm² in order to conduct the evaluation under fixed conditions.

The weatherability of printed images was then evaluated. An environment which was well ventilated, but not exposed to directly the sunlight was provided in an office. Each of the prints, which had been obtained by printing on the respective recording materials with the inks as shown in Examples 1 to 9 and Comparative Examples 1 to 4 in Table 1, was left over for 1 month in the environment to measure the color difference (ΔE) between the print after leaving over for 1 month and the original print by a color difference meter "CA-35" (manufactured by Murakami Shikisai Gijutsu Kenkyusho K.K.).

The results are shown in Table 1. When the magenta and cyan inks, which were free of any surface active agent, were mixed on the recording material 1 or 2 (Comparative Examples 1 to 4), a color irregularity occurred. To the contrary, no color irregularity occurred so long as the surface active agent was contained in any one of these inks (Examples 1 to 9).

With respect to the weatherability, the discoloration is observed by the naked eye in the case where ΔE is about 10 or greater. Any ΔE smaller than about 10 gives no visible discoloration. Therefore, the weatherability of the prints was good in any cases.

Standard for color irregularity:
A: No color irregularity was recognized;
B: Color irregularity was scarcely recognized;
C: Color irregularity was slightly recognized; and
D: Color irregularity was conspicuously recognized.

According to the present invention, as described above, color images excellent in weatherability and free from a color irregularity and hence extremely good in quality can be formed on light-coated paper, which contains basic magnesium carbonate as a pigment, even when an ink containing any cyan dye is used.

What is claimed is:

1. A method of forming color images using a plurality of color inks including a cyan ink, comprising the steps of:

providing a recording material provided with an ink-receiving layer, which contains basic magnesium carbonate having a BET specific surface area of 30 to 120 m²/g and which has a dry coat weight of from 1 to 15 g/m², wherein at least one of the cyan ink and one or more another inks to form mixed-color areas with the cyan ink contains a surface active agent; and applying at least one of the cyan ink and the plurality of color inks, wherein a cyan dye contained in the cyan ink is represented by the general formula wherein M means an alkali metal atom, an ammonium ion or an organic amine residue, m stands for a number of from 1 to 4, and n is a number of from 0 to 3.

2. The method of forming color images according to claim 1, wherein the area of images formed with a mixed color of the cyan ink and one or more another inks is at least 9 mm², the total amount of the inks jetted therein is from 5 to 30 nl/mm², and the mixing ratio of the cyan ink to one or more another inks is from 1:10 to 10:1 by weight.

3. The method of forming color images according to claim 1, wherein the surface active agent is contained in a range of from 0.001 to 2% by weight of the total weight of the inks.

TABLE 1

| | Recording material | proportion of inks in mixed color | | | | | | Total amount of inks jetted nl/mm² | Occurrence of color irregularity | ΔE after 1 month |
| --- | --- | --- | --- | --- | --- | --- | --- | --- | --- | --- |
| | | C1 | C2 | M1 | M2 | Y1 | Y2 | | | |
| Ex. 1 | 1 | 10 | | 1 | | | | 16 | A | 7.0 |
| Ex. 2 | 1 | 2 | | 3 | | | | 16 | A | 2.5 |
| Ex. 3 | 1 | 3 | | 2 | | | | 5 | A | 4.0 |
| Ex. 4 | 1 | 1 | | 1 | | | | 30 | B | 5.5 |
| Ex. 5 | 1 | 2 | | | | | 3 | 15 | A | 2.3 |
| Ex. 6 | 1 | 1 | | 7 | | 3 | | 17 | A | 1.0 |
| Ex. 7 | 1 | 1 | | | 1 | | | 16 | A | 3.7 |
| Ex. 8 | 2 | | 1 | 1 | | | | 16 | A | 3.4 |
| Ex. 9 | 2 | 7 | | | | 3 | | 30 | B | 7.1 |
| Comp. Ex. 1 | 1 | | 2 | 3 | | | | 16 | D | 2.5 |
| Comp. Ex. 2 | 1 | | 10 | 1 | | 1 | | 16 | C | 6.5 |
| Comp. Ex. 3 | 1 | | 2 | 3 | | | | 5 | C | 2.0 |
| Comp. Ex. 4 | 2 | 3 | | 2 | | | | 20 | D | 4.1 |

4. The method of forming color images according to claim 1, wherein the surface active agent is contained in a range of from 0.01 to 1% by weight of the total weight of the inks.

5. The method of forming color images according to claim 1, wherein the surface active agent is contained in a range of from 0.01 to 0.1% by weight of the total weight of the inks.

6. The method of forming color images according to claim 1, wherein the surface active agent is a nonionic surfactant.

7. A method of forming color images using an ink-jet recording system to apply a plurality of color inks including a cyan ink, comprising the step of:

provided a recording material provided with an ink-receiving layer, which contains basic magnesium carbonate having a BET specific surface area of 30 to 120 $m^2/g$ and has a dry coat weight of from 1 to 15 $g/m^2$, wherein at least one of the cyan ink and one or more another inks to form mixed-color areas with the cyan ink contains a surface active agent; and applying at least one of the cyan ink and the plurality of color inks, wherein a cyan dye contained in the cyan ink is represented by the general formula wherein M means an alkali metal atom, an ammonium ion or an organic amine residue, m stands for a number of from 1 to 4, and n is a number of from 0 to 3.

8. The method of forming color images according to claim 7, wherein the area of images formed with a mixed color of the cyan ink and one or more another inks is at least 9 $mm^2$, the total amount of the inks jetted therein is from 5 to 30 $nl/mm^2$ and the mixing ratio of the cyan ink to one or more another inks is from 1:10 to 10:1 by weight.

9. The method of forming color images according to claim 7, wherein the surface active agent is contained in a range of from 0.001 to 2% by weight of the total weight of the inks.

10. The method of forming color images according to claim 9, wherein the surface active agent is contained in a range of from 0.01 to 1% by weight of the total weight of the inks.

11. The method of forming color images according to claim 7, wherein the surface active agent is contained in a range of from 0.01 to 0.1% by weight of the total weight of the inks.

12. The method of forming color images according to claim 7, wherein the surface active agent is a nonionic surfactant.

13. A method of forming color images using an On-Demand ink-jet recording system to apply a plurality of color inks including a cyan ink, comprising the step of:

providing a recording material provided with an ink-receiving layer, which contains basic magnesium carbonate having a BET specific surface area of 30 to 120 $m^2/g$ and has a dry coat weight of from 1 to 15 $g/m^2$, wherein at least one of the cyan ink and one or more another inks to form mixed-color areas with the cyan ink contains a surface active agent; and applying at least one of the cyan ink and the plurality of color inks, wherein a cyan dye contained in the cyan ink is represented by the general formula wherein M means an alkali metal atom, an ammonium ion or an organic amine residue, m stands for a number of from 1 to 4, and n is a number of from 0 to 3.

14. The method of forming color images according to claim 13, wherein the area of images formed with a mixed color of the cyan ink and one or more another inks is at least 9 $mm^2$, the total amount of the inks jetted therein is from 5 to 30 $nl/mm^2$, and the mixing ratio of the cyan ink to one or more another inks is from 1:10 to 10:1 by weight.

15. The method of forming color images according to claim 13, wherein the surface active agent is contained in a range of from 0.001 to 2% by weight of the total weight of the inks.

16. The method of forming color images according to claim 13, wherein the surface active agent is contained in a range of from 0.01 to 1% by weight of the total weight of the inks.

17. The method of forming color images according to claim 13, wherein the surface active agent is contained in a range of from 0.01 to 0.1% by weight of the total weight of the inks.

18. The method of forming color images according to claim 13, wherein the surface active agent is a nonionic surfactant.

19. A method of forming color images using an ink-jet recording system making use of thermal energy to apply a plurality of color inks including a cyan ink, comprising the step of:

providing a recording material provided with an ink-receiving layer, which contains basic magnesium carbonate having a BET specific surface area of 30 to 120 $m^2/g$ and has a dry coat weight of from 1 to 15 $g/m^2$, wherein at least one of the cyan ink and one or more another inks to form mixed-color areas with the cyan ink contains a surface active agent; and applying at least one of the cyan ink and the plurality of color inks, wherein a cyan dye contained in the cyan ink is represented by the general formula wherein M means an alkali metal atom, an ammonium ion or an organic amine residue, m stands for a number of from 1 to 4, and n is a number of from 0 to 3.

20. The method of forming color images according to claim 19, wherein the area of images formed with a mixed color of the cyan ink and one or more another inks is at least 9 mm$^2$, the total amount of the inks jetted therein is from 5 to 30 nl/mm$^2$, and the mixing ratio of the cyan ink to one or more another inks is from 1:10 to 10:1 by weight.

21. The method of forming color images according to claim 19, wherein the surface active agent is contained in a range of from 0.001 to 2% by weight of the total weight of the inks.

22. The method of forming color images according to claim 19, wherein the surface active agent is contained in a range of from 0.01 to 1% by weight of the total weight of the inks.

23. The method of forming color images according to claim 19, wherein the surface active agent is contained in a range of from 0.01 to 0.1% by weight of the total weight of the inks.

24. The method of forming color images according to claim 19, wherein the surface active agent is a nonionic surfactant.

* * * * *

UNITED STATES PATENT AND TRADEMARK OFFICE
CERTIFICATE OF CORRECTION

PATENT NO. : 5,583,553

DATED : December 10, 1996

INVENTOR(S): KOROMO SHIROTA ET AL.

It is certified that error appears in the above-identified patent and that said Letters Patent is hereby corrected as shown below:

[57] ABSTRACT

Line 12, "and is" should read --and n is--.

COLUMN 2

Line 8, "far" should read --more--.
    Line 31, "On-Demand" should read --on-demand--.
    Line 50, "pass" should read --passage--.
    Line 53, "line A-B" should read --line 2-2'--.

COLUMN 3

Line 10, "forms" should read --form--.

COLUMN 5

Line 45, "surfactants," should read --surfactants--.

COLUMN 6

Line 2, "solvents," should read --solvents--.
    Line 42, "additives," should read --additives--.

COLUMN 7

Line 46, "an" should read --a--.
    Line 48, "an" should read --a--.
    Line 54, "is not limited" should read --to which this invention is not limited--.

UNITED STATES PATENT AND TRADEMARK OFFICE
CERTIFICATE OF CORRECTION

PATENT NO. : 5,583,553

DATED : December 10, 1996

INVENTOR(S) : KOROMO SHIROTA ET AL.

It is certified that error appears in the above-identified patent and that said Letters Patent is hereby corrected as shown below:

COLUMN 8

Line 11, "line A-B" should read --line 2-2'--.

COLUMN 9

Line 48, "Comparative" should read --comparative--.

COLUMN 11

Line 12, "to directly" should read --directly to--.

COLUMN 13

Line 11, "step" should read --steps--.
    Line 45, "nl/mm$^2$" should read --nl/mm$^2$,--.
    Line 51, "claim 9," should read --claim 7,--.
    Line 61, "On- should read --on- --.
    Line 62, "Demand" should read --demand--.
    Line 63, "step" should read --steps--.

UNITED STATES PATENT AND TRADEMARK OFFICE
CERTIFICATE OF CORRECTION

PATENT NO. : 5,583,553

DATED : December 10, 1996

INVENTOR(S): KOROMO SHIROTA ET AL.                    Page 3 of 3

It is certified that error appears in the above-identified patent and that said Letters Patent is hereby corrected as shown below:

<u>COLUMN 14</u>

Line 54, "step" should read --steps--.

Signed and Sealed this

Eighth Day of July, 1997

*Attest:*

BRUCE LEHMAN

*Attesting Officer*         *Commissioner of Patents and Trademarks*